2,847,447

PRODUCTION OF ACRYLONITRILE

Thomas R. Steadman, Waban, and James F. Gabbett, Jr., Weymouth, Mass., assignors, by mesne assignments, to Escambia Chemical Corporation, Pace, Fla., a corporation of Delaware No Drawing. Application April 3, 1956
Serial No. 575,707

7 Claims. (Cl. 260—465.3)

This invention relates to the production of chemicals and in particular to an improved process for the production of acrylonitrile. This application is a continuation in part of the copending application Serial No. 530,614, filed August 25, 1955, now abandoned.

A principal object of the present invention is to provide an improved process for the production of high yields of acrylonitrile readily and cheaply by reacting hydrogen cyanide with acetylene in the vapor phase.

Another object of the invention is to provide an improved process of the above type which permits the use of simple and inexpensive equipment for performing the reaction between hydrogen cyanide and acetylene.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

It is well known that acrylonitrile can be prepared by reacting hydrogen cyanide with acetylene in the vapor phase in the presence of a suitable catalyst. Many catalysts have been reported to be suitable for this reaction and include such materials as activated carbon, silica gel and solid or porous inert or inactive support materials, having either a high surface activity or little or no surface activity, impregnated with alkali metal cyanides, carbonates or hydroxides or mixtures of alkali metal cyanides, etc.

Heretofore, the reaction between hydrogen cyanide and acetylene has been reported to be carried out in reactors whose inner surfaces were formed of, or coated with, such materials as Vycor, ceramic materials, steel and the like. However, the use of such reactor surfaces on an industrial scale is not entirely satisfactory due to their high cost, fragility, frequent need for renewal or catalytic influence which induces undesirable side reactions. It is now well recognized that common reactor materials such as iron or steel induce degradation of acetylene and hydrogen cyanide which seriously affects the yields of acrylonitrile. However, iron and steel, and particularly steel reactors, with reactant-contacting surfaces consisting essentially of an iron-aluminum alloy can be utilized to give good yields of acrylonitrile. The use of such reactors makes the present process readily adaptable to commercial operations on an efficient and economical basis.

The process of the present invention preferably comprises catalytically reacting a mixture of hydrogen cyanide and acetylene in the vapor phase in a reactor having a reactant-contacting surface consisting essentially of an iron-aluminum alloy. In one embodiment of the invention, the catalyst employed is an inert or inactive support, and particularly a porous charcoal support, impregnated or carrying an alkali metal hydroxide, cyanide or carbonate. The inert support, such as porous charcoal, may be impregnated with from about 3 percent to 15 percent by weight of an alkali metal hydroxide, cyanide or carbonate and preferably with about 10 percent by weight of an alkali metal hydroxide, the preferred alkali metal hydroxide being sodium hydroxide.

A more detailed description of producing acrylonitrile in the preferred reactors of the present invention is given in the following examples set forth only to illustrate and not to limit the invention.

*Example I*

195 grams of an unactivated softwood charcoal were heated at atmospheric pressure to a temperature of about 700° C. in a stream of hydrogen for about 24 hours. Water and other oxygenated products formed during the conditioning were removed. The charcoal, on completion of the hydrogen treatment, was found to weigh 125 grams. 125 grams of the deoxygenated charcoal were then impregnated with an aqueous solution containing about 12.5 grams of sodium hydroxide to provide, after drying, about 10 percent by weight of sodium hydroxide in the charcoal. Upon completion of the sodium hydroxide impregnation, the catalyst was heated at atmospheric pressure at a temperature on the order of about 550° C. in a stream of hydrogen cyanide until the recovery of hydrogen cyanide in the off-gases rose to over 80 percent, which, in this case, was on the order of about 60 minutes. A mixture of acetylene, hydrogen cyanide and diluent gases was passed at a space velocity of about 580 hr.$^{-1}$ (STP) through a carbon steel reactor tube having a reactant-contacting surface consisting essentially of an iron-aluminum alloy and containing approximately 138 grams of the thus prepared catalyst (i. e., 125 grams of deoxygenated charcoal plus weight of sodium hydroxide). The iron-aluminum alloy surface of the reactor, in this instance, was prepared by means of a pack calorizing method which consists essentially of packing the interior of the steel tube with powdered aluminum, heating it at temperatures ranging from 1500° F. to 1800° F. for a prolonged period of time, and then removing the packed aluminum from the reactor. The reaction tube, during production of acrylonitrile, was heated in the temperature range of between about 565° C. and 590° C. The mole ratio of acetylene to hydrogen cyanide was about 1.0, with the amount of acetylene in the acetylene feed stream amounting to approximately 7.4 percent and the pressure being substantially atmospheric. The average conversion of hydrogen cyanide to acrylonitrile during a run of 50 hours was 67.8 percent, while the average yield of acrylonitrile was 89.5 percent based on hydrogen cyanide. There was synthesized a weight of acrylonitrile equal to about 9.0 times the weight of the deoxygenated charcoal used in preparing the catalyst.

*Example II*

This reaction was carried out as in Example I (under approximately the same conditions of temperature, pressure, catalysts, etc.) except that the reactor consisted of a carbon steel tube whose reactant-contacting surfaces had been formed by dipping the reactor in molten aluminum and then heating the resultant aluminum coating at 1300° F. to 1400° F. for about 48 hours to bring about the formation of a surface consisting essentially of an iron-aluminum alloy. The average conversion of hydrogen cyanide to acrylonitrile during a run of 112 hours was 76 percent. The average yield of acrylonitrile was 86 percent based on hydrogen cyanide. There was synthesized a weight of acrylonitrile equal to about 21 times the weight of the deoxygenated charcoal used in preparing the catalyst.

Example III

This reaction was carried out as in Example I (under approximately the same conditions of temperature, pressure, catalysts, etc.) except that the reactor consisted of a carbon steel tube which had an integral lining of aluminum of 1/16 inch thick so that the reactor surfaces were formed of aluminum backed by steel. The average conversion of hydrogen cyanide to acrylonitrile during a run of 19 hours was 55.6 percent, while the average yield of acrylonitrile was 73.0 percent based on hydrogen cyanide.

Example IV

This reaction was carried out as in Example I (under approximately the same conditions of temperature, pressure, catalysts, etc.) except that the reactor was made of only carbon steel. The average conversion of hydrogen cyanide to acrylonitrile during a run of 10.5 hours was 44.4 percent, while the average yield of acrylonitrile was 56.2 percent based on hydrogen cyanide.

Examples I–IV provide a direct comparison between a carbon steel reactor, an aluminum-surfaced reactor and iron-aluminum alloy-surfaced reactors. It will be noted that much better conversions to, and yields of, acrylonitrile were obtained in the carbon steel reactor having reactant-contacting surfaces consisting essentially of an iron-aluminum alloy than in the other illustrated reactors.

As used in this disclosure, the term "calorizing" denotes a process for coating a surface of iron or steel with aluminum in such a way that the aluminum forms an alloy with the steel and produces a thin, adherent iron-aluminum alloy surface. The alloying of aluminum with steel, using a calorizing process, takes place by means of diffusion. The depth of penetration in the steel of the aluminum and, consequently, the thickness of the iron-aluminum alloy, as well as the quantity of aluminum in the alloy, may vary depending upon such factors as the calorizing method employed and the use to which the calorized steel is to be put. Various methods of calorizing are well known and a more detailed discussion thereof may be found in "Metals Handbook," 1948 edition, published by the American Society for Metals, pages 703–704. In addition to calorizing, the desired reactor surface may be obtained by other methods such as the aluminum dip-heat treating method illustrated in Example II.

The dipping of the reactor tube in molten aluminum produces on the inner surfaces of the tube a thin coating of aluminum. Of itself this coating is probably insufficient to give a suitable reactor surface. However, the alloying of this thin aluminum coating with the steel to yield a surface consisting essentially of an iron-aluminum alloy layer can be accomplished by means of heat treating. The ultimate depth of penetration in the steel of the aluminum and, consequently, the thickness of the iron-aluminum alloy, as well as the quantity of aluminum in the alloy, may vary depending upon such factors as the dipping method employed and the temperatures and time at which the heat treatment is carried out. The temperature and time employed for the heat-treating step may be varied considerably from that illustrated in Example II. The iron-aluminum alloy formed by these methods is probably present as $Fe_3Al$.

The results obtained from the iron-aluminum alloy-surfaced steel reactors are quite surprising and novel. As previously stated, iron or steel reactors exert an undesirable catalytic influence on the reactants at reaction temperatures. Thus, on conducting the reaction between acetylene and hydrogen cyanide in a steel reactor, the yields and conversions obtained are markedly inferior to the results obtained with iron-aluminum alloy-surfaced reactors. This is clearly illustrated in comparing the results of Examples I and II with Example IV. In Example IV, when the catalyst in the steel reactor was examined after only about 10 hours of use, substantial deposits of carbonaceous material were found on the walls of the reactor and on the catalyst particles. The catalyst particles proved to be strongly cemented together by this deposit. This undesirable occurrence does not take place in the preferred steel reactor having an iron-aluminum surface, even after many weeks of use. Naturally, it is very advantageous to be able to avoid this deposition of carbonaceous material, since, in addition to causing losses of reacting materials and making difficult the removal of spent catalyst, the deposition also lends to stoppage of the flow of gases through the reactor. In the present invention, although iron alloyed with aluminum is present in contact with the reactants, no deleterious catalytic influence is noticed and excellent yields of acrylonitrile are obtained.

The temperature range for the reaction between acetylene and hydrogen cyanide may vary from about 450° C. to about 700° C. However, it is preferably maintained between about 525° C. and 625° C. The space velocity may vary from about 100 to about 1500 hr.$^{-1}$ (STP), preferred space velocities being on the order of between about 300 and 800 hr.$^{-1}$ (STP). The molar ratio of acetylene to hydrogen cyanide may be varied quite widely from between about 0.5:1 to about 1.6:1 and higher, preferred molar ratios being on the order of between about 0.8:1 to 1.2:1.

In the above example, specific operating conditions have been given. These conditions, however, are subject to considerable variation without departing from the scope of the invention. For example, the pressure range in the reactor may vary from about atmospheric pressure to about 100 pounds per square inch. Inert or inactive catalyst supports other than oxygen-free, porous charcoal can be employed. Likewise, such supports can carry or be impregnated with an alkali metal carbonate or cyanide, in addition to the alkali metal hydroxide illustrated. Although this invention has been described in connection with the use of dilute acetylene streams (i. e., acetylene streams containing less than 15 percent acetylene, the remainder being made up of one or more inert gas diluents), it is also applicable to concentrated acetylene streams.

Since certain changes may be made in the above process without departing from the scope of the invention herein involved, it is intended that all matter contained in the above description shall be interpreted as illustrative and not in a limiting sense.

What is claimed is:

1. In the process for the production of acrylonitrile by reacting a mixture of acetylene and hydrogen cyanide in the vapor phase in the presence of an inert catalyst support carrying a compound selected from the group consisting of the alkali metal hydroxides, cyanides and carbonates, the improvement which comprises reacting said mixture in a reactor having a reactant-contacting surface consisting essentially of iron and aluminum in alloy form.

2. In the process for the production of acrylonitrile by reacting a mixture of acetylene and hydrogen cyanide in the vapor phase in the presence of a porous charcoal support carrying a compound selected from the group consisting of the alkali metal hydroxides, cyanides and carbonates, the improvement which comprises reacting said mixture in a reactor having a reactant-contacting surface consisting essentially of iron and aluminum in alloy form.

3. In the process for the production of acrylonitrile by reacting a mixture of acetylene and hydrogen cyanide at a temperature within the range of 450° C. to 700° C. in the presence of a porous charcoal support carrying a compound selected from the group consisting of the alkali metal hydroxides, cyanides and carbonates, the improvement which comprises reacting said mixture in a steel reactor having a reactant-contacting surface consisting essentially of iron and aluminum in alloy form.

4. In the process for the production of acrylonitrile by reacting a mixture of acetylene and hydrogen cyanide at a temperature within the range of 450° C. to 700° C. in the presence of a deoxygenated charcoal carrying a compound selected from the group consisting of the alkali metal hydroxides, cyanides and carbonates, the improvement which comprises reacting said mixture in a steel reactor having a reactant-contacting surface consisting essentially of iron and aluminum in alloy form.

5. In the process for the production of acrylonitrile by reacting a dilute stream of acetylene and hydrogen cyanide at a temperature within the range of 450° C. to 700° C. in the presence of a porous charcoal support carrying a compound selected from the group consisting of the alkali metal hydroxides, cyanides and carbonates, the improvement which comprises reacting said mixture in a steel reactor having a reactant-contacting surface consisting essentially of iron and aluminum in alloy form.

6. The process of claim 5 wherein said acetylene stream contains less than 15 percent acetylene.

7. In the process for the production of acrylonitrile by reacting a mixture of acetylene and hydrogen cyanide in the vapor phase in the presence of an inert catalyst support carrying a compound selected from the group consisting of the alkali metal hydroxides, cyanides and carbonates, the improvement which comprises reacting said mixture in a reactor having a reactant-contacting surface consisting essentially of $Fe_3Al$.

References Cited in the file of this patent

UNITED STATES PATENTS

| | | |
|---|---|---|
| 1,398,960 | Davis et al. | Dec. 6, 1921 |
| 1,988,217 | Sayles | Jan. 15, 1935 |
| 1,995,647 | Pier et al. | Mar. 26, 1935 |
| 2,413,496 | Green et al. | Dec. 31, 1946 |
| 2,413,623 | Harris | Dec. 31, 1946 |
| 2,419,186 | Harris et al. | Apr. 15, 1947 |
| 2,502,678 | Spaulding et al. | Apr. 4, 1950 |
| 2,762,834 | Gabbett et al. | Sept. 11, 1956 |
| 2,789,126 | Anderson et al. | Apr. 16, 1957 |

UNITED STATES PATENT OFFICE
CERTIFICATE OF CORRECTION

Patent No. 2,847,447                                                          August 12, 1958

Thomas R. Steadman et al.

It is hereby certified that error appears in the printed specification of the above numbered patent requiring correction and that the said Letters Patent should read as corrected below.

Column 2, line 34, for "580" read -- 530 --; column 4, line 15, for "lends" read -- leads --.

Signed and sealed this 18th day of November 1958.

(SEAL)

Attest:
KARL H. AXLINE

Attesting Officer

ROBERT C. WATSON
Commissioner of Patents